United States Patent [19]

Usui

[11] Patent Number: 4,646,361
[45] Date of Patent: * Feb. 24, 1987

[54] OPTICAL STAR REPEATER

[75] Inventor: Takeshi Usui, Tokyo, Japan

[73] Assignee: NEC Corporation, Tokyo, Japan

[*] Notice: The portion of the term of this patent subsequent to Jul. 23, 2002 has been disclaimed.

[21] Appl. No.: 587,643

[22] Filed: Mar. 8, 1984

[30] Foreign Application Priority Data

Mar. 10, 1983 [JP] Japan ................................. 58-39880

[51] Int. Cl.$^4$ ............................................. H04B 9/00
[52] U.S. Cl. ..................................... 455/601; 370/85; 455/607; 455/612
[58] Field of Search ............... 455/601, 607, 612, 617; 370/4, 85; 340/825.5

[56] References Cited

U.S. PATENT DOCUMENTS

| | | | |
|---|---|---|---|
| 4,229,831 | 10/1980 | Lacher | 455/619 |
| 4,234,968 | 11/1980 | Singh | 455/607 |
| 4,337,457 | 6/1982 | Tache | 455/608 |
| 4,380,761 | 4/1983 | Boggs | 340/825.5 |
| 4,422,179 | 12/1983 | Albanese | 455/601 |
| 4,531,238 | 7/1985 | Rawson et al. | 455/601 |
| 4,531,239 | 7/1985 | Usui | 455/607 |

OTHER PUBLICATIONS

Rawson et al., "Topical Meeting on Optical Fiber Communication", Technical Digest (Apr. 13-15, 1982).
Rawson, "Fibernet: Multimode Optical Fibers for Local Computer Networks", IEEE Transactions on Communications, vol. Com-26, No. 7 (7,'78).
Oshima et al., Opt. Com. Con. (1979) 19.5 (in Japanese). "Rotation-Splice Tapered Fiber Star Coupler", by Oshima et al., Optical Communication Conference, Amsterdam, Sep. 17-19, 1979.

Primary Examiner—Joseph A. Orsino, Jr.
Attorney, Agent, or Firm—Schwartz, Jeffery, Schwaab, Mack, Blumenthal & Evans

[57] ABSTRACT

An optical star network for an optical repeater which requires a reduced number of optical receivers.

A star repeater receives optical signals transmitted from various communications terminals and checks for data collisions based on output signals of an optical detector. The star repeater is therefore operable to simultaneously receive numerous optical signals using a single receiver. Upon detection of a data collision, the star repeater generates a jam signal. Each communications station monitors the jam signal to provide communication control. Data collisions are detected based on the fact that the leading and trailing edges of optical pluse signals are detected alternately only when no data collisions occur.

11 Claims, 10 Drawing Figures

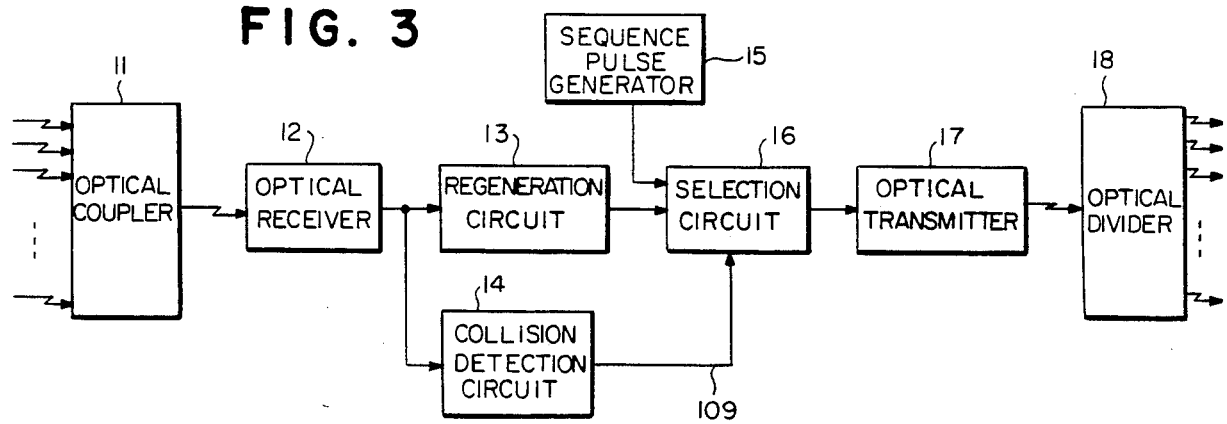
FIG. 3
FIG. 4a
FIG. 4b
FIG. 5
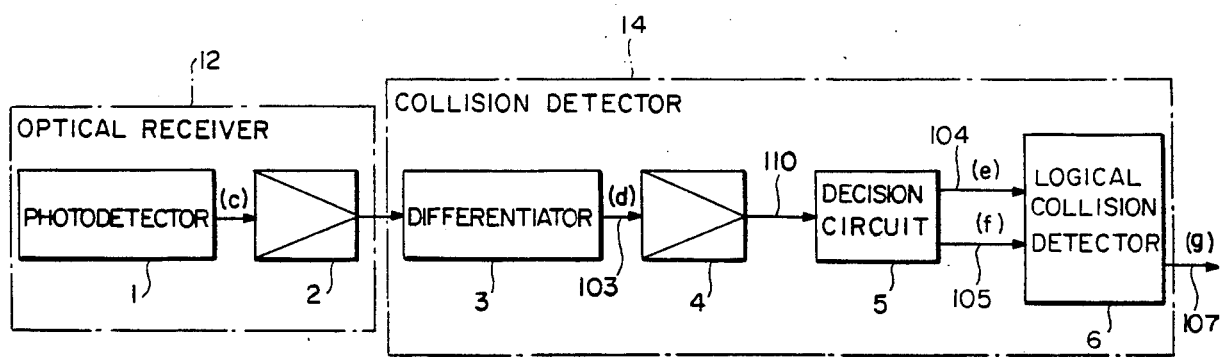

OPTICAL STAR REPEATER

BACKGROUND OF THE INVENTION

The present invention relates to optical communications systems and, more particularly, to an optical star repeater for an optical star network which allows a plurality of remote terminals to communicate with each other.

Optical communications systems have recently made remarkable progress and have been extensively used in a variety of fields. One such application is an optical network in which a plurality of remote communications terminals are interconnected by an optical star network to perform multiplex, time-division transmission and reception of optical signals. This type of optical network, or optical star network as it is generally referred to, has various advantages. For example, system flexibility and economy are excellent, trouble due to electromagnetic induction are eliminated since transmission paths are electrically non-conductive, and circuit reliability is high since only the communications terminals which are transmitting or receiving are required to remain in operation.

A typical optical star network of the type described above is schematically shown in FIG. 1. Optical signals transmitted from various optical communications terminals, or transceivers, 201-20n reach a star coupler 101 via optical transmission paths 311-31n, respectively. The star coupler 101 distributes each of the incoming optical signals to the transmission paths 311-31n, thereby sending each incoming signal to each communications terminals 201-20n. Such an optical star network is described in Eric G. Rawson and Robert M. Mecalte "Fibernet: Multimode Optical Fibers for Local Computer Networks", IEEE Transactions on Communications, Vol. COM-26, No. 7, July 1978, pp. 983-990 (Rawson et al.).

For such a network control, and in the case of electrical communications, a control system of the type which monitors the presence or absence of a received signal and the presence or absence of data collisions is usually used to detect a free time for transmission.

However, where numerous optical communications terminals are interconnected by means of the above-described optical star network, a star coupler which simply comprises an optical branching device would result in critical losses. It is therefore advantageous to use an optical star repeater so that a received optical signal may be converted into an electrical signal and, after regeneration, into an optical signal to be retransmitted. Such a device is disclosed in FIG. 4 of Rawson et al. The received optical signal, unlike an electrical signal, has an intensity which differs from one communications terminal to another. Therefore, should optical signals from various communications terminals be received together, optical signals of high intensity may conceal those of less intensity during regneration. For this reason, in contrast to an electrical communications network, an optical star network is incapable of performing communications controls by simply having each transmission terminal monitor data collisions.

In light of this, a network has been proposed which uses an optical star repeater of the type illustrated in FIG. 2 in place of the optical star coupler shown in FIG. 1 in order to regenerate and redistribute optical signals. In operation, the network of FIG. 2 receives and regenerates optical signals coming from different optical communications terminals by means of discrete optical receivers 111-11n. The regenerated optical signals are routed via line transmitters 121-12n to a bus line 131 which operates in a manner similar to a conventional electrical data bus. The optical signals then pass to a line receiver 141 and are transmitted as optical signals from an optical transmitter 151. This type of optical star repeater is described by Eric G. Rawson et al. in "Fibernet II: an Active Star-Configurd Fiber-Optic Local Computer Network with Data Collision Sending", Technical Digest, Topical Meeting on Optical Fiber Communication, pp. 22-23, Apr. 1-15, 1982. A drawback encountered with such a network is that the star repeater has to be furnished with the same number of optical receivers as the optical communications terminals, resulting in an expensive and bulky construction.

SUMMARY OF THE INVENTION

It is therefore an object of the present invention to provide an optical star repeater which requires only a single or a reduced number of optical receivers, thereby eliminating the drawback discussed above.

An optical star repeater embodying the present invention comprises a plurality of input terminals, a plurality of output terminals, one or more optical detectors which are fewer in number than the number of input or output terminals, regenerator means, optical transmitter means, means for detecting a data collision in response to output signals of the optical detector or detectors, and means for producing a predetermined signal when a data collision is detected.

In an optical star network according to the present invention, a star repeater receives optical signals transmitted from various communications terminals and, prior to regeneration of those signals, checks for data collisions based on output signals of one or more optical detectors in a manner described below. The star repeater, therefore, is capable of simultaneously receiving numerous optical signals using a single receiver. Upon detection of a data collision, the star repeater generates a jam signal. Each communications station preferably monitors the jam signal to provide communication control. Data collisions are preferably detected utilizing the fact that the leading and trailing edges of pulses are detected alternately only when no data collisions occur. Details of this principle are disclosed in copending U.S. patent application Ser. No. 488,877, hereby incorporated by reference.

BRIEF DESCRIPTION OF THE DRAWING

FIG. 3 is a block diagram of an optical star repeater embodying the present invention;

FIG. 4a illustrates an example of DMI code signal modes applicable to a preferred embodiment of the present invention;

FIG. 4b illustrates a pulse pattern of a sequence pulse generator for use in the present invention;

FIG. 5 is a block diagram of a data collision detection circuit with an optical receiver circuit of a preferred embodiment of the present invention;

DETAILED DESCRIPTION OF THE PREFERRED EMBODIMENT

Figure 1:
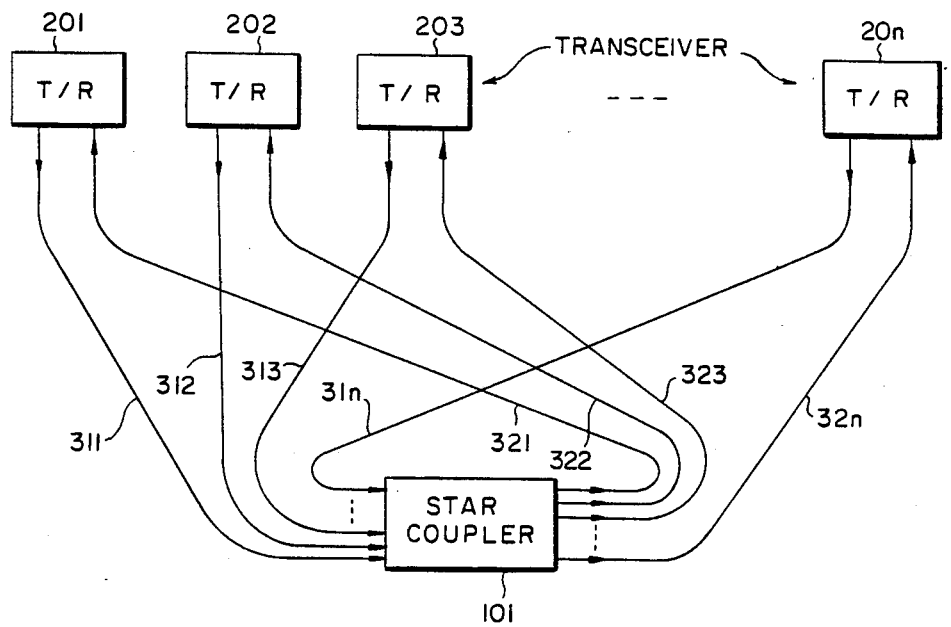
FIG. 1 is a block diagram of an ordinary star-configured optical network.
Figure 2:
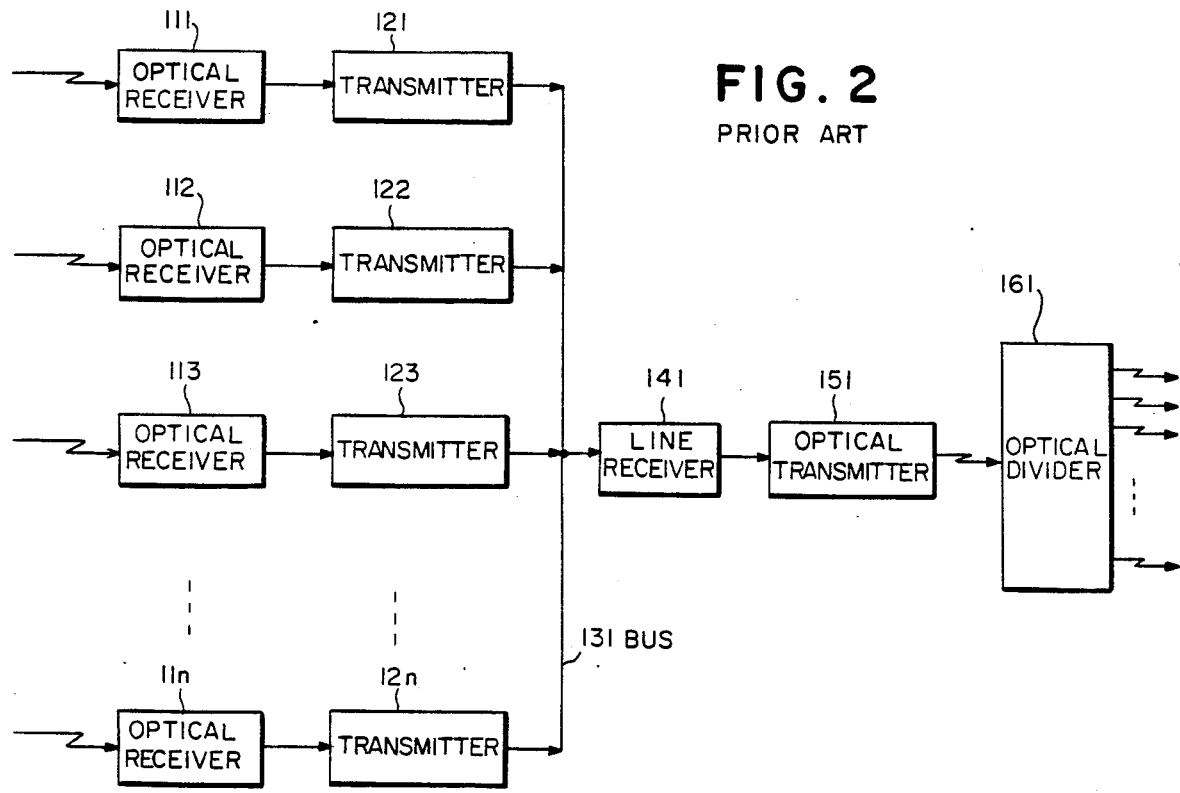
FIG. 2 is a block diagram of a prior art optical star repeater.

Referring to FIG. 3, an optical star repeater 501 in accordance with the present invention is shown. The illustrated star repeater is used in place of the star coupler 101 shown in FIG. 1.

In FIG. 3, optical pulse signals transmitted from for example ten optical communications terminals, or transceivers, are incident on an optical coupler 11 of the repeater and, then, collectively routed to an optical receiver circuit 12. In this particular embodiment, each of the optical pulse signals from the communications terminals may employ a DMI (Differential Mark Inversion) code which has a bit rate of 32 Mb/s and is converted prior to transmission from the transceivers, into an optical pulse signal by a light emitting diode (LED) having a wavelength of 0.85 μm. An example of DMI code signal modes is illustrated in FIG. 4a. The output of the optical couplers 11 is processed into an electrical pulse signal by the optical receiver circuit 12, which as detailed below, comprises a photodetector and an amplifier circuit. Amplified to an adequate level, the electrical pulse signal from the receiver circuit 12 is applied to a regeneration circuit 13 and a collision detection circuit 14. The regeneration circuit 13, which comprises a comparator circuit, compares the input pulse signal with a reference voltage to regenerate the original DMI code pulse signal. Meanwhile, the collision detection circuit 14 checks for a collision of data packets by detecting leading and trailing edges of the pulses. The outputs of the regenerator 13 and collision detector 14 are fed to a selection circuit 16. If no data collision indication is present, the selection circuit 16 selects an output signal of the regenerator 13 for further processing. If a data collision indication is present, the selection circuit 16 selects an output of a fixed signal source 15 which comprises a sequence pulse generator which repeatedly generates a specific pulse pattern. For example, a pulse pattern having a repetition pulse pattern of NRZ (non return to zero) and "0111"0 a bit rate of 32 Mb/s, as shown in FIG. 4b, may be employed. The signal selected by the selector 16 is applied to an optical transmitter circuit 17 to be converted into an optical signal. The optical signal is distributed to all the transceivers, for example ten in this embodiment, via an optical divider 18 or the like. An optical coupler of the type having a 10:1 fused tapered fiber and having an input (output) end which is formed by fusing bundled ends of a plurality of optical fibers may be used in the optical coupler 11 or optical divider 18. For details of such an optical coupler, reference may be made to Oshima "Silica Tapered Fiber Star Coupler", Collection of Lecture Papers in 1982 National Congress of Electronics and Communications Engineers in Japan, Vol. 8, No. 2299, pp. 8–339.

As described above, in an optical star network, a signal output from any one of the transceivers is usually distributed through a star repeater to all the other transceivers. In response to a data collision, the star repeater supplies each transceiver with a jam signal which is the specific pulse pattern output of the fixed signal source 15. Meanwhile, each transceiver monitors the presence or absence of an input signal and the presence or absence of a jam signal to determine a free time, to thereby perform communication control during that free time.

In FIG. 5, the collision detector 14 is shown with an associated optical receiver circuit 12. The receiver circuit 12 and its operation are described in detail in the above-mentioned U.S. patent application Ser. No. 488,877. The optical receiver circuit 12 includes a photodetector 1 and a preamplifier 2. The collision detector 14 includes a differentiator 3, a main amplifier 4, a decision circuit 5 and a logical collision detector 6. These devices are preferably interconnected by leads. The photodetector 1, which may be a silicon photodiode, is capable of receiving light from transmitters of remote transceivers via the optical coupler 11.

Figure 6:
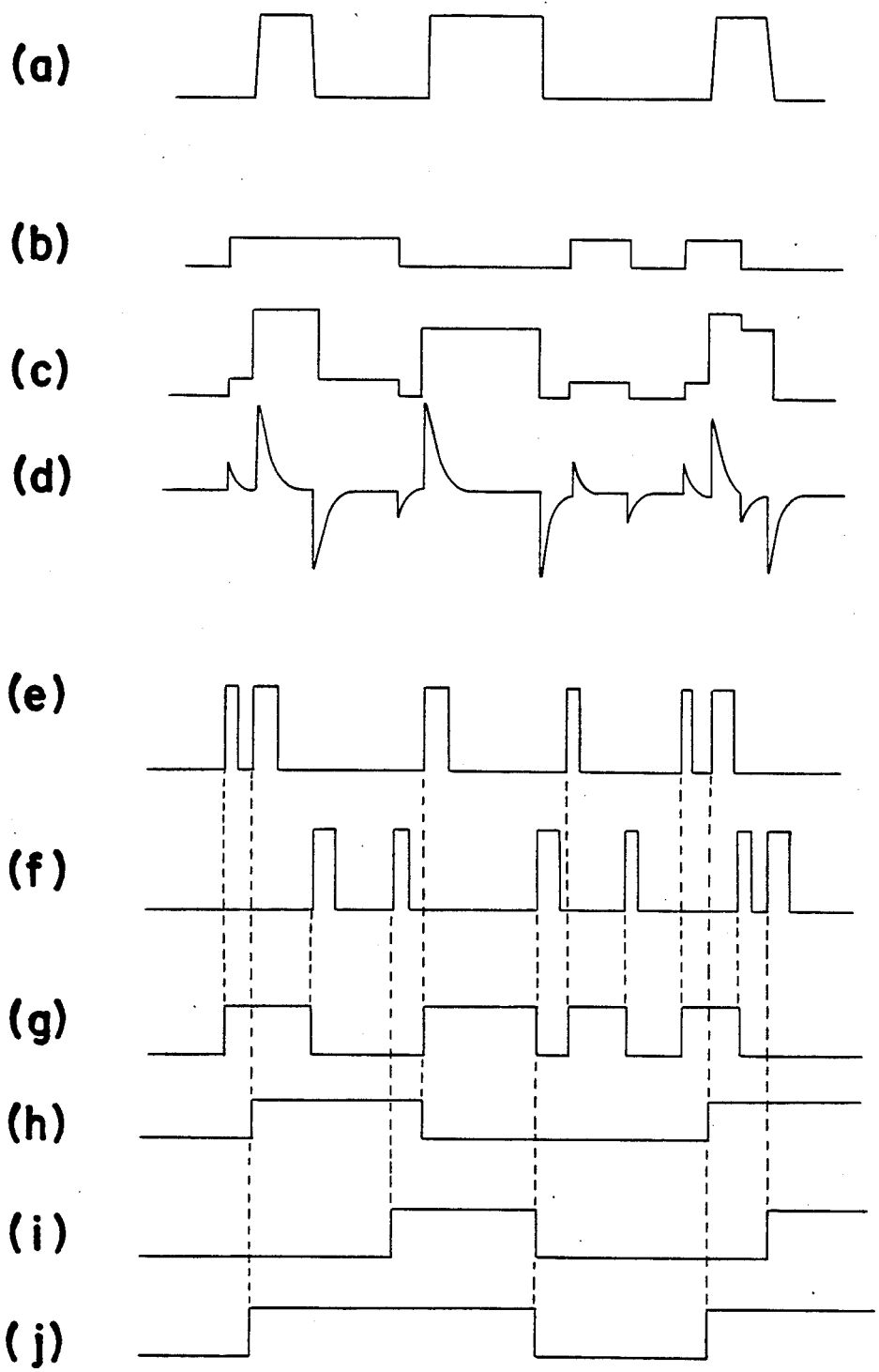
FIG. 6 is a timing chart representing signals which appear in various portions of the collision detection circuit of FIGS. 5, 7 and 8.

Referring now to FIG. 6, the operation of the system of FIG. 5 will be described. The photodetector 1 transforms an optical signal input into an electrical signal (c). Assume that the signal (c) is the sum of a signal component (a) transmitted from one transceiver and a signal component (b) transmitted from another transceiver. After photoelectric conversion the signal (c) is amplified by the preamplifier 2 to a suitable level below a saturation level. The output of the preamplifier 2 is processed by the differentiator 3 to produce a balanced bipolar signal (d) at lead 103. The differentiator 3 may comprise a low frequency suppressing filter and, is preferably designed to have a time constant corresponding to the filter cut-off frequency, which is smaller than the pulse width of the incoming signal by at least a predetermined amount. The balanced bipolar signal (d) is amplified by the main amplifier 4 and fed to the decision circuit 5. The decision circuit 5 is operable to discriminate between the positive and negative pulses of the input signal.

Figure 7:
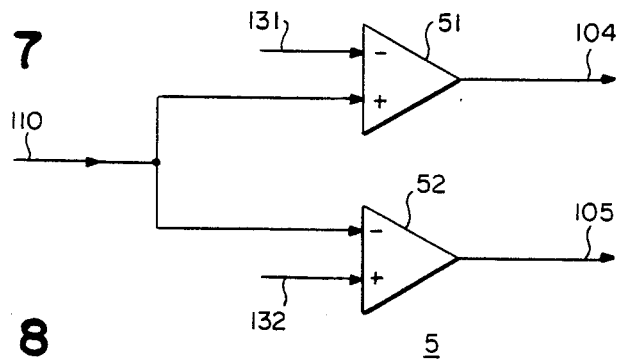
FIG. 7 is a block diagram of a decision circuit from the collision detection circuit of FIG. 5.

As shown in FIG. 7, the decision circuit 5 may comprise a pair of comparators 51 and 52. The output signal from the amplifier 4 is fed via a lead 110 to both the noninverting terminal of the comparator 51 and to the inverting terminal of the comparator 52 so that the positive and negative pulses may be independently identified.

The comparator 51 compares the signal from the amplifier 4 with a reference voltage 131 which is higher than the average voltage of the amplifier output signal, thereby producing a positive logic signal (e) at 104. The comparator 52 compares the signal from the amplifier 4 with a reference voltage 132 which is lower than the average voltage of that signal, thereby producing a negative logic signal (f) at 105.

If the optical signal input into the receiver circuit 12 is transmitted from a single transmitter, positive and negative pulses in the signal (d) will be identified alternately. Therefore, the appearance of a plurality of consecutive pulses of positive or negative polarity in signals (e) and (f) respectively means that a plurality of signals have occupied the network at the same time. Stated another way, the occurrence of a signal collision can be detectable by determining whether a plurality of positive or negative pulses, signals (e) and (f) respectively, appear serially. Because the positive/negative identification is performed after differentiating the signal (c) into a balanced signal (d) as described, this operation is free from the influence of a change in DC level or the like to provide accurate identification even where there exists a substantial difference in power between incoming signals.

The comparator outputs (e) and (f) are fed to the logic circuit 6 which as described below operable to reproduce the received signal and extract a signal indicative of a signal collision.

Figure 8:
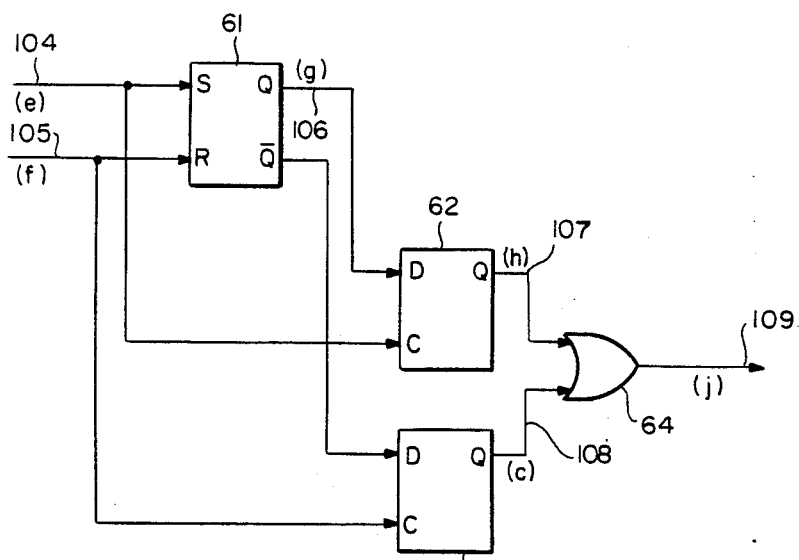
FIG. 8 is a diagram of a logic circuit from the collision detection circuit of FIG. 5.

FIG. 8 illustrates a preferred embodiment of the logic circuit 6 which operates to generate a collision detection signal to a line 109 when a collision is detected. As shown, the logic circuit 6 includes an SR flip-flop 61 and two D-type flip-flops 62 and 63. The signals (e) and (f) are respectively coupled to the S and R inputs of the SR flip-flop 61 and to the clock terminals C of the D-type flip-flops 62 and 63. The Q and $\overline{Q}$ outputs of the SR flip-flop 61 are connected to the D inputs of the D-type flip-flops 62 and 63, respectively.

In the circuitry shown in FIG. 8, the SR flip-flop 61 is set to the (logical) "1" level by the leading edge of a positive signal (e) and reset to "0" by the leading edge of a negative signal (f). The Q output of the flip-flop 61 varies as shown in (g) of FIG. 6 when, as illustrated, data packets are partly in collision with each other. Both D-type flip-flops 62 and 63 are triggered at the leading edges of pulses. Specifically, the flip-flop 62 is loaded with the Q output of the SR flip-flop 61 (i.e. the signal (g)), the "1" level of which is triggered at the leading edges of the positive pulses of signal (e). The flip-flop 63 is loaded with the $\overline{Q}$ output of the SR flip-flop 61 the "0" level of which is triggered by the leading edges of the negative pulses (f). The outputs (h) and (i) of the flip-flops 62 and 63 are fed to an OR gate 64 via lines 107 and 108, respectively. The OR of the two inputs appears on line 109 as a signal (j) shown in FIG. 6. With this arrangement, in the intervals where positive and negative pulses alternate with each other, the outputs (h) and (i) of the D-type flip-flops are both at a "0" level and so is the output (j) of the OR gate 64. When a train of consecutive positive or negative pulses appears continuously, the outputs of the flip-flops 62 or 63 go to a "1" level making the OR gate 64 output (j) "1". Therefore, the output (j) of the OR gate 64 functions as a collision detection signal which assumes a "1" level under a collision condition and a "0" level under a noncollision condition. This collision detection signal (j) is supplied to the selector 16 (FIG. 3), which passes the NRZ pattern signal from the sequence pulse generator 15 to an optical transmitter circuit 17 when a collision is detected and the regenerated signal from the regeneration circuit 13 when no collision is detected. The collision detection signal (j) is preferably reset from a "1" to a "0" level whenever three or more positive and negative pulses have regularly alternated with each other.

Figure 9:
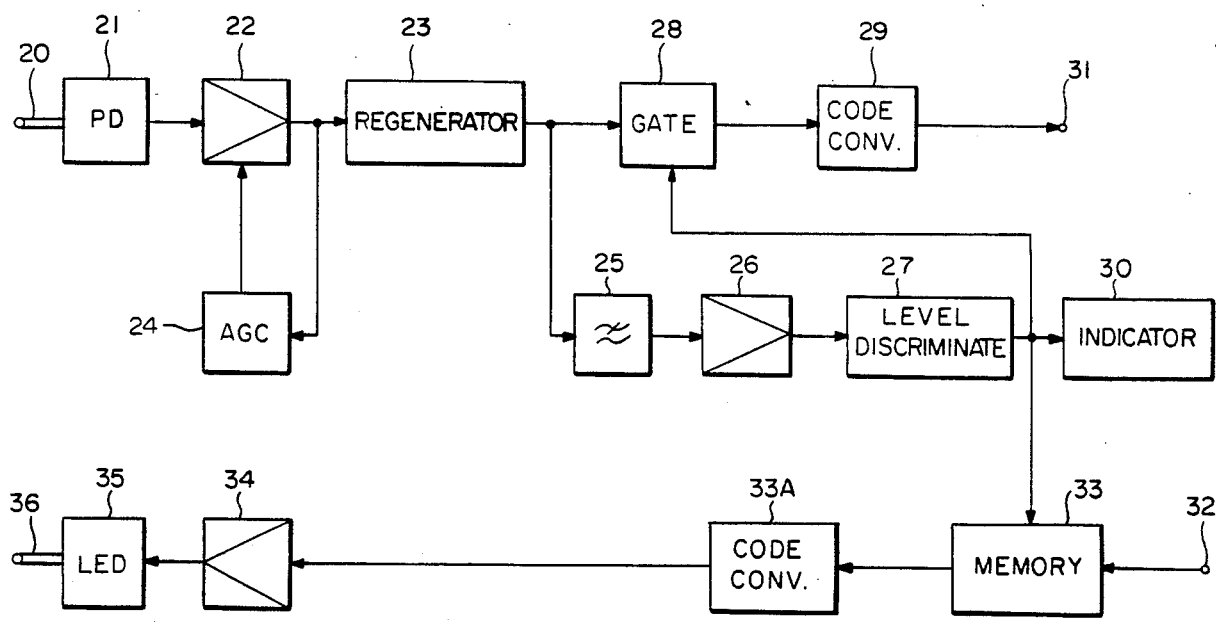
FIG. 9 is a block diagram of an optical communications terminal illustrating a preferred embodiment of the present invention.

Further signal processing will now be described with reference to FIG. 9. The optical pulse signal transmitted from the optical star repeater 501 (FIG. 3) via an optical fiber 20 arrives at a Si-photodiode (PD) photodetector 21 and is converted into an electrical pulse signal. The electrical pulse signal is amplified by an amplifier 22 which is furnished with an AGC (automatic gain control) circuit 24. The output of the amplifier 22 is applied to both the AGC control circuit 24 and a regenerator 23. The AGC control 24 preferably comprises a peak detector and a comparator/amplifier and functions to control the amplification ratio of the amplifier 22 such that the peak value of the pulse signal input into the regenerator 23 is maintained constant regardless of the level of the optical pulse signal output from the optical fiber 20. The regenerator 23 preferably comprises a comparator, which is operable to regenerate the input pulse signal and to generate an output pulse which is applied to a gate 28 and a low pass filter 25. The low pass filter 25 is operable to pass only components of the input pulse signal having a frequency less than about 1 kHz. The output of the low pass filter 25 is amplified by a dc-amplifier 26, the output of which is coupled to a level discriminator 27. The level discriminator 27 preferably comprises a three-level discriminator having input level which selectively assumes one of three different levels. When no optical pulse signal is outputted from the optical fiber 20, the input level of the discriminator 27 assumes a low level one which may for example be substantially a 0 V level; when a normal DMI code signal is outputted from the optical fiber 20, the input level assumes a medium level, for example 1 V, which does not vary regardless of the pulse pattern of the particular DMI codes. When a data collision exists and the optical pulses from the optical fiber 20 comprise a repetition pulse pattern of NRZ "0111", which is the signal generated by the pulse generator 15, the input level of the level discriminator 27 assumes the highest of the three levels, for example 1.5 V. The level discriminator 27 produces DC output signals having three different levels for example $-5$ V, 0 V and $+5$ V which correspond to the low, medium and high input levels, respectively. The output level is applied to an indicator 30. Using values from the above example, when the input to the indicator 30 is $-5$ V, a blue lamp of the indicator 30 is turned on to indicate that no signal has arrived at the output of the optical fiber 20; when the output level is 0 V, a yellow lamp is turned on to indicate that a signal has arrived with no data collisions (i.e., a non-collision signal); and when the output level is $+5$ V, a red lamp is turned on to indicate that a data collision has occurred (i.e., a collision signal). The above-mentioned colors and the use of lamps as indicators are of course exemplary only and other colors or indicators can be substituted. The output of the level discriminator 27 is also routed to the gate 28 which generates a zero level output when the output level of the level discriminator 27 is $+5$ V, i.e., indicating a data collision. When the output level of the level discriminator 27 is 0 V or $-5$ V, indicating no data collision, the gate 28 allows the output of the regenerator 23 to pass directly therethrough.

The signal passed through the gate 28 is converted by a code conversion circuit 29 from the DMI code pulse into an NRZ (nonreturn to zero) code pulse which is then sent out to external terminal equipment for data processing and/or storage via an output terminal 31. On the other hand, a signal from external terminal equipment is applied to an input terminal 32 and therefrom to a memory 33. The memory 33 is controlled by the output level of the level discriminator 27 and operates to directly pass the input signal if the discriminator output level is 0 V or $-5$ V. When the discriminator output level is $+5$ V, indicative of a data collision, the memory 33 stores the input signal and only transmits it after the output level of the level discriminator 27 assumes 0 V or $-5$ V, indicative of no data collision. The output of the memory 33 is conerted by an input code conversion circuit 33A from the NRZ code into a DMI code. The DMI code is amplified by a drive circuit 34 to drive a light emitting diode (LED) 35, which preferably comprises GaAlAs. The LED 35 emits an optical pulse signal having a wavelength of for example 0.85 μm which is transmitted by an optical fiber 36 to the star repeater shown in FIG. 3.

Some modifications are possible concerning the embodiment shown and described. For example, the fixed signal source 15 may comprise an oscillator whose frequency is twice the transmission bit rate. In such a modification, a normally transmitted signal and a jam signal belong to different frequency bands and, therefore, involve little likelihood of being mixed up, while allowing the jam signal to be detected within a short period of time. It is necessary, however, to design the transmitter section of the star repeater and the receiver section of a communications terminal with a frequency band which is wider than the frequency band required in the embodiment shown and described.

It will be apparent that the oscillator frequency mentioned above need not always be double the frequency band of transmitted signals as long as it is sufficiently different from the frequency band of transmitted signals.

While the illustrative embodiment is constructed using an optical coupler and an optical branching or divider circuit, the light input and output ends of an optical transmission path may be individually bundled and connected to a photodetector of an optical receiver circuit or to a light source of an optical transmitter circuit either directly or via a lens system. In this case, where a substantial number of transmission paths are laid, a plurality of optical receiver circuits or a plurality of optical transmitter circuits may be used.

In summary, it will be seen that the present invention provides an optical star network which allows numerous optical communications terminals to exchange data by means of an optical star repeater comprising of a single or, a minimal number of optical receivers. This advantage is attainable in accordance with the present invention by causing the star repeater to perform regeneration and data collision detection, and by sending out a jam signal in the event of a data collision.

What is claimed is:

1. An optical star repeater for use in an optical star network, comprising:
   a photoelectric transducer for coupling optical signals from a plurality of receiving paths into a coupled optical signal and for converting said coupled optical signal into an electrical signal;
   means for regenerating the electrical signal from the photoelectric transducer to produce a regenerated electrical signal;
   means for detecting a collision of the optical signals from said plurality of paths from the electrical signal;
   signal generator means for generating a fixed signal;
   selecting means, responsive to the detecting means, for selecting said fixed signal in response to a collision indication and for selecting the regenerated electrical signal when no collision is detected;
   means for converting the selected signal from the selecting means into an output optical signal; and
   means for transmitting the output optical signal into a plurality of transmitting paths;
   wherein said photoelectric transducer comprises an optical coupler for coupling together said optical signals from said plurality of receiving paths to provide said coupled optical signal, and an optical receiver for receiving said coupled optical signal,
   wherein said optical signals comprise optical code pulse signals and said coupled optical signal comprises coupled optical code pulse signals, and said optical receiver comprises a photodetector connected to the optical coupler to receive the coupled optical code pulse signals and an amplifier connected to said photodetector and operable to generate said electrical signal, and
   wherein said electrical signal comprises a series of pulses corresponding to the received coupled optical code pulse signals, said detecting means being operable to detect leading and trailing edges of said pulses for generating a data collision indication responsive to the detection of a plurality of consecutive leading or trailing edges.

2. The optical star repeater of claim 1 wherein said regenerating means comprises a comparator operable to compare said electrical signal to a reference value to regenerate a code pulse from said coupled optical signal.

3. The optical star repeater of claim 1 wherein the fixed signal comprises a repeating pulse pattern.

4. The optical star repeater of claim 1 wherein said detecting means provides a non-collision indication corresponding to a non-collision of optical signals and wherein said optical star network comprises:
   means for receiving said output optical signal and for converting same into an electrical pulse signal; and
   a gate, responsive to said non-collision indication for passing said electrical pulse signal to an external equipment terminal and responsive to a collision indication for blocking said electrical pulse signal from said external equipment terminal.

5. An optical star repeater for use in an optical star network, comprising:
   a photoelectric transducer for coupling optical signals from a plurality of receiving paths into a coupled optical signal and for converting said coupled optical signal into an electrical signal;
   means for regenerating the electrical signal from the photoelectric transducer to produce a regenerated electrical signal;
   means for detecting a collision of the optical signals from said plurality of paths from the electrical signal;
   signal generator means for generating a fixed signal;
   selecting means, responsive to the detecting means, for selecting said fixed signal in response to a collision indication and for selecting the regenerated electrical signal when no collision is detected;
   means for converting the selected signal from the selecting means into an output optical signal; and
   means for transmitting the output optical signal into a plurality of transmitting paths;
   wherein said photoelectric transducer comprises an optical coupler for coupling together said optical signals from said plurality of receiving paths to provide said coupled optical signal, and an optical receiver for receiving said coupled optical signal;
   wherein said optical signals comprise optical code pulse signals and said coupled optical signal comprises coupled optical code pulse signals, and said optical receiver comprises a photodetector connected to the optical coupler to receive the coupled optical code pulse signals, and an amplifier connected to said photodetector and operable to generate said electrical signal, and wherein said electrical signal comprises a series of pulses corresponding to the received coupled optical code pulse signals and said detecting means comprises a differentiator responsive to said electrical signal to produce a bipolar signal, a decision circuit operable to receive said bipolar signal and to discriminate between positive and negative pulses thereof, and a logic circuit responsive to an output from said decision circuit to provide a data collision indication whenever a plurality of consecutive positive or negative pulses are detected.

6. The optical star repeater of claim 5 wherein said decision circuit comprises a first and a second comparator, said first comparator being operable to compare said bipolar signal with a first reference voltage greater than an average voltage of said bipolar signal and to produce a positive logic signal when said bipolar signal is greater than said first reference signal, said second comparator being operable to compare said bipolar signal with a second reference voltage lower than said average voltage of the bipolar signal and to produce a negative logic signal when said bipolar signal is less than said second reference signal.

7. The optical star repeater of claim 6 wherein said logic circuit further comprises flip-flop means responsive to an output of said first and second comparators for providing a logic signal having first and second stable states respectively indicative of a data collision and no data collision.

8. A method for transmitting a plurality of received optical code pulse signals in an optical star network having an optical star repeater comprising the steps of:
coupling together said plurality of received optical code pulse signals to provide coupled optical signals;
detecting said coupled optical signals to provide detected optical signals;
converting said detected optical signals into electrical signals comprising a series of pulses corresponding to the received optical code pulse signals;
detecting collisions of said plurality of received optical code pulse signals by differentiating said electrical signals to produce bipolar signals, detecting said bipolar signals, and discriminating between positive and negative portions of said bipolar signals, and producing a collision indication signal whenever a plurality of consecutive positive or negative portions are detected;
generating a fixed signal;
selecting, in response to said collision indication signal, said fixed signal, and, in response to a no collision indication signal, said electrical signal;
converting the selected signal into an output optical signal; and
transmitting the output optical signal to a plurality of optical receivers.

9. The method of claim 8 further comprising the step of regenerating said electrical signal wherein said selecting step includes selecting said regenerated electrical signal in response to a non-collision indication.

10. The method of claim 8 further comprising the steps of:
receiving the output signal;
converting the received signal into an electrical pulse signal;
determining whether said electrical pulse signal is based on said fixed signal or said electrical signal;
passing said electrical pulse signal to an output terminal whenever said electrical pulse signal is based on said electrical signal; and
blocking transmission of said electrical pulse signal to said output terminal whenever said electrical pulse is based on said fixed signal.

11. The method of claim 10 further comprising the steps of:
receiving an input signal from external equipment;
passing said input signal to a memory;
storing said input signal in said memory whenever said electrical pulse signal is based on said fixed signal;
passing said stored input signal from said memory whenever said electrical pulse signal is based on said electrical signal;
converting said input signal into an optical signal; and
transmitting said optical signal to a device for coupling said plurality of optical signals.

* * * * *